(12) United States Patent
Shu et al.

(10) Patent No.: US 10,698,248 B2
(45) Date of Patent: Jun. 30, 2020

(54) COUNTER SUBSTRATE, DISPLAY PANEL, DISPLAY DEVICE AND FABRICATING METHOD

(71) Applicant: BOE Technology Group Co., Ltd., Beijing (CN)

(72) Inventors: Shi Shu, Beijing (CN); Chuanxiang Xu, Beijing (CN); Teng Luo, Beijing (CN); Feng Gu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 152 days.

(21) Appl. No.: 15/810,591

(22) Filed: Nov. 13, 2017

(65) Prior Publication Data

US 2018/0314105 A1    Nov. 1, 2018

(30) Foreign Application Priority Data

Apr. 28, 2017    (CN) .......................... 2017 1 0294428

(51) Int. Cl.
*G02F 1/1335* (2006.01)
*G02F 1/1339* (2006.01)
(Continued)

(52) U.S. Cl.
CPC ...... *G02F 1/133512* (2013.01); *G02F 1/1339* (2013.01); *G02F 1/1368* (2013.01);
(Continued)

(58) Field of Classification Search
CPC ............. G02F 1/133512; G02F 1/1339; G02F 1/13394; G02F 1/1368; G02F 1/136286;
(Continued)

(56) References Cited

U.S. PATENT DOCUMENTS

2004/0012549 A1*  1/2004  Nishikawa .......... H01L 27/3272
                                                    345/76
2010/0134748 A1*  6/2010  Ishitani ................. G02F 1/1339
                                                    349/153
(Continued)

FOREIGN PATENT DOCUMENTS

CN          1746329 A      3/2006
CN          102331896 A    1/2012
(Continued)

OTHER PUBLICATIONS

Chinese Office Action for counterpart 201710294428.5 dated Apr. 23, 2019.
(Continued)

*Primary Examiner* — Nathanael R Briggs
*Assistant Examiner* — William D Peterson
(74) *Attorney, Agent, or Firm* — Arent Fox LLP; Michael Fainberg

(57) ABSTRACT

The present disclosure provides a counter substrate, a display panel, a display device, and fabricating method, further simplifying the fabricating process of the display panel by reducing the number of masking times required during the making of a spacer pattern and a frame light shielding pattern while achieving the frame light shielding function of the counter substrate and getting the counter substrate conductive with an array substrate. The fabricating method of the counter substrate comprises: forming a transparent electrode layer on a first base substrate; forming a black spacer pattern and a frame light shielding pattern at the same time
(Continued)

on the transparent electrode layer, wherein the frame light shielding pattern comprises a first via hole that exposes a portion of the transparent electrode layer; and forming a conductive light shielding layer pattern in the first via hole.

15 Claims, 4 Drawing Sheets

(51) Int. Cl.
*G02F 1/1368* (2006.01)
*G02F 1/1362* (2006.01)
*G02F 1/1343* (2006.01)
*G02F 1/1333* (2006.01)

(52) U.S. Cl.
CPC ...... *G02F 1/13394* (2013.01); *G02F 1/13439* (2013.01); *G02F 1/136286* (2013.01); *G02F 1/13338* (2013.01); *G02F 1/136227* (2013.01); *G02F 2001/13398* (2013.01); *G02F 2001/136222* (2013.01); *G02F 2201/121* (2013.01); *G02F 2202/16* (2013.01); *G02F 2203/01* (2013.01)

(58) Field of Classification Search
CPC ............. G02F 1/13439; G02F 1/13338; G02F 1/136227; G02F 2001/136222; G02F 2001/13398; G02F 2201/121; G02F 2203/01; G02F 2202/16
USPC .......................................................... 349/12
See application file for complete search history.

(56) References Cited

U.S. PATENT DOCUMENTS

| | | | |
|---|---|---|---|
| 2015/0372011 | A1 | 12/2015 | Zhang et al. |
| 2016/0027818 | A1* | 1/2016 | Yoo ................... G02F 1/136286 257/43 |
| 2016/0349571 | A1 | 12/2016 | Shin |
| 2017/0255288 | A1 | 9/2017 | Wang et al. |
| 2018/0052347 | A1* | 2/2018 | Yu ......................... G02F 1/1368 |

FOREIGN PATENT DOCUMENTS

| | | |
|---|---|---|
| CN | 202522818 U | 11/2012 |
| CN | 102880325 A | 1/2013 |
| CN | 103985717 A | 8/2014 |
| CN | 104238806 A | 12/2014 |
| CN | 204479880 U | 7/2015 |
| CN | 104898318 A | 9/2015 |
| CN | 105302363 A | 2/2016 |
| CN | 105372866 A | 3/2016 |
| CN | 105511189 A | 4/2016 |
| CN | 105807992 A | 7/2016 |

OTHER PUBLICATIONS

Chinese Office Action for counterpart 201710294428.5 dated Sep. 25, 2019.

* cited by examiner

COUNTER SUBSTRATE, DISPLAY PANEL, DISPLAY DEVICE AND FABRICATING METHOD

CROSS-REFERENCE TO RELATED APPLICATIONS

This application claims the priority to Chinese Patent Application No. 201710294428.5, filed on Apr. 28, 2017, the content of which is hereby incorporated by reference in its entirety.

FIELD

The present disclosure relates to the field of displaying, in particular to a counter substrate, a display panel, a display device and fabricating method.

BACKGROUND

A liquid crystal display panel typically includes an array substrate, a color film substrate, liquid crystal and a packaging material. In recent years, in order to reduce the box aligning accuracy, get adapted to the curved surface and reduce the number of masking times, people gradually choose to arrange a color filter layer on an array substrate (i.e., Color Filter On Array, COA), which can reduce the box aligning accuracy.

For a product in which a color filter layer is arranged on an array substrate and a Vertical Alignment (VA) is adopted, a common electrode is usually arranged on a counter substrate opposed to the array substrate, that is, the counter substrate sequentially includes a base substrate, a frame light shielding layer arranged on the base substrate, and an entire common electrode layer arranged on the frame light shielding layer, where the frame light shielding layer includes a frame light shielding pattern for shielding a frame. A display panel enables the array substrate to provide an electrical signal to the common electrode layer on the counter substrate using a gold ball arranged on the frame, and a spacer is arranged on the array substrate. However, for the display panel with such a structure, the frame light shielding pattern and the spacer are formed using a mask process twice, resulting in that the fabricating of the frame light shielding pattern and the spacer is more complicated.

SUMMARY

An embodiment of the present disclosure further provides a fabricating method of a counter substrate, including: forming a transparent electrode layer on a first base substrate; forming a spacer pattern and a frame light shielding pattern at the same time on the transparent electrode layer, where the frame light shielding pattern includes a first via hole that exposes a portion of the transparent electrode layer; and forming a conductive light shielding layer pattern in the first via hole.

An embodiment of the present disclosure further provides a fabricating method of a display panel, including: forming an array substrate; forming a counter substrate; and aligning the array substrate and the counter substrate; where the forming the counter substrate includes: forming a transparent electrode layer on a first base substrate; forming a spacer pattern and a frame light shielding pattern at the same time on the transparent electrode layer, where the frame light shielding pattern comprises a first via hole that exposes a portion of the transparent electrode layer; and forming a conductive light shielding layer pattern in the first via hole.

An embodiment of the present disclosure further provides a counter substrate, including: a transparent electrode layer arranged on a first base substrate; a spacer pattern and a frame light shielding pattern arranged on the transparent electrode layer, where the frame light shielding pattern includes a first via hole that exposes a portion of the transparent electrode layer; and a conductive light shielding layer pattern arranged in the first via hole.

An embodiment of the present disclosure further provides a display panel, including the counter substrate according to the embodiment of the present disclosure and further including an array substrate.

An embodiment of the present disclosure further provides a display device, including the display panel according to the embodiment of the present disclosure.

DETAILED DESCRIPTION OF THE EMBODIMENTS

Figure 1:
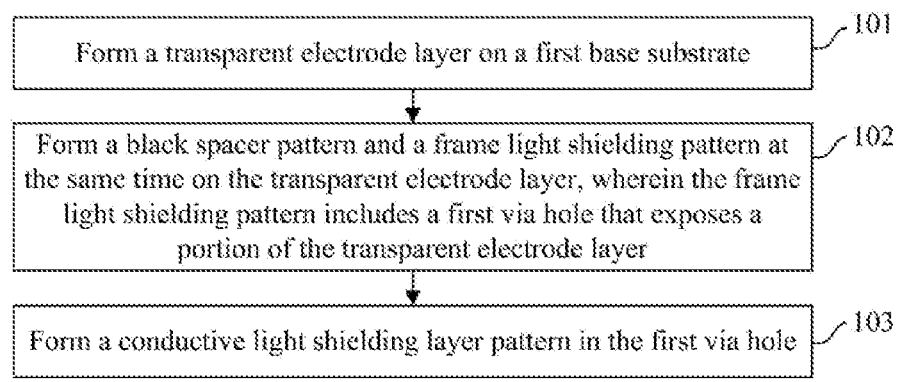
FIG. 1 is a flow chart of a fabricating method of a counter substrate according to an embodiment of the present disclosure.

The implementation processes of the embodiments of the present disclosure will be described in detail below with reference to the accompanying drawings. It is to be noted that the same or similar reference numerals refer to the same or similar elements or elements having the same or similar functions throughout. The embodiments described below with reference to the accompanying drawings are exemplary and are intended to be illustrative only and are not to be construed as limiting the scope of the present disclosure.

Referring to FIG. 1, an embodiment of the present disclosure provides a fabricating method of a counter substrate, including the following steps.

Step 101 is to form a transparent electrode layer on a first base substrate.

Specifically, a transparent common electrode layer may be formed on the first base substrate; or a transparent common electrode layer reused as a touch electrode may be formed on the first base substrate. The first base substrate particularly may be a glass base substrate.

Step 102 is to form a spacer pattern and a frame light shielding pattern at the same time on the transparent electrode layer, where the frame light shielding pattern includes a first via hole that exposes a portion of the transparent electrode layer.

Specifically, a spacer pattern and a frame light shielding pattern can be formed at the same time on the transparent electrode layer using a gray tone mask process, that is, generally, the thickness of the spacer pattern is larger than that of the frame light shielding pattern. Since a black spacer layer is firstly formed on the transparent electrode layer and then using the gray tone mask process, the spacer pattern can be formed in a region corresponding to a pixel region and the frame light shielding pattern can be formed at the peripheral region by using a mask process once.

Step 103 is to form a conductive light shielding layer pattern in the first via hole.

Optionally, the step of forming a conductive light shielding layer pattern in the first via hole specifically includes: forming an entire conductive light shielding layer; coating a photoresist layer on the light shielding layer, where the thickness of the photoresist layer in the first via hole is larger than the thickness of the photoresist layer in regions other than the first via hole; thinning the photoresist layer to further remove all photoresist in regions other than the first via hole, and removing part of photoresist in the first via hole at the same time; and removing the light shielding layer in regions other than the first via hole under the shielding of the photoresist in the first via hole.

It should be noted that, during the coating of the photoresist layer, since there is no pattern in a large area of the pixel region, the photoresist is relatively thin. The photoresist in the first via hole is relatively thick because the first via hole in the first via hole region of the frame is small. That is, after the coating of a photoresist layer, without carrying out other treatments, it is naturally formed that the photoresist layer in the first via hole region is thicker while the photoresist layer in regions other than the first via hole is thinner. Furthermore, when the entire photoresist layer is treated later, after the photoresist in regions other than the first via hole region has been completely removed, the photoresist may be left in the first via hole, and further the light shielding layer in the regions other than the first via hole region may be removed under the shielding of the remaining photoresist in the first via hole. As compared with the prior art where the patterned photoresist layer is formed by a masking, exposure and development process, the embodiment of the present disclosure reduces the number of masking times by one and simplifies the fabricating process of the spacer pattern and the frame light shielding pattern.

For the specific material of the light shielding layer, it may be a transparent conductive metallic oxide which is treated to reduce the light transmittance. Specifically, the transparent conductive metal oxide may be, for example, indium tin oxide. The light shielding layer may also be made of a light shielding metal which specifically may be one of Mo, Al, Nd, or a combination thereof. In order to avoid reflection of metal, optionally, the light shielding layer is indium tin oxide treated with hydrogen plasma. That is, forming an entire conductive light shielding layer may be implemented by forming an entire conductive transparent metallic oxide layer, and treating the transparent metallic oxide layer with hydrogen plasma to reduce the transmittance of the transparent metallic oxide layer to further form the light shielding layer; or forming an entire conductive light shielding layer may also be implemented by forming an entire conductive metal light shielding layer.

In specific implementation, the transparent electrode layer may be made of a transparent metallic oxide. When the transparent electrode layer is made of a transparent metallic oxide and the material of the light shielding layer before being treated with hydrogen plasma is the same transparent conductive metallic oxide as the material of the transparent electrode layer, the step of forming the transparent electrode layer on the first base substrate specifically includes: forming a conductive transparent metallic oxide layer on the first base substrate and annealing the transparent metallic oxide layer. The step of removing the light shielding layer in regions other than the first via hole under the shielding of the photoresist in the first via hole specifically includes: removing the light shielding layer in regions other than the first via hole using solution etching under the shielding of the photoresist in the first via hole. That is, when the transparent electrode layer and the light shielding layer are both made of a conductive metallic oxide, after the transparent electrode layer is formed, the transparent electrode layer is annealed, thus avoiding affecting the transparent electrode layer during the later removal of the light shielding layer by using a solution.

Figure 2:
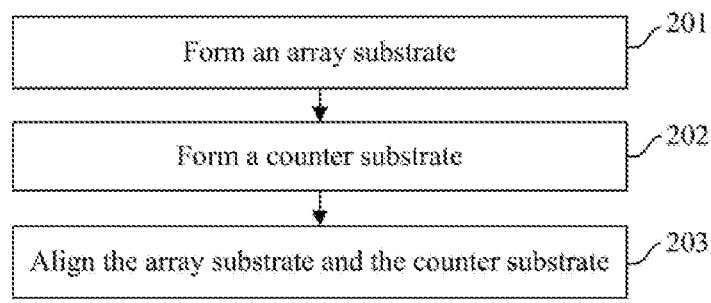
FIG. 2 is a flow chart of a fabricating method of a display panel according to an embodiment of the present disclosure.

Referring to FIG. 2, an embodiment of the present disclosure further provides a fabricating method of a display panel, including the following steps.

Step 201 is to form an array substrate.

Step 202 is to form a counter substrate by using the fabricating method according to the embodiment of the present disclosure.

Step 203 is to align the array substrate and the counter substrate.

Optionally, the step 201 of forming the array substrate specifically includes: mixing a conductive substance and a sealant, and then coating a mixture of the conductive substance and the sealant on a sealant region of the array substrate; and the step 203 of aligning the array substrate and the counter substrate specifically includes: aligning the array substrate and the counter substrate and allowing the conductive substance of the array substrate to come into contact with the light shielding layer pattern in the first via hole of the counter substrate so that the array substrate provides an electrical signal for the transparent electrode layer of the counter substrate. The conductive substance specifically may be a gold ball.

In specific implementation, the fabricating method of the array substrate further includes the following step.

Sequentially forming a gate layer, a gate insulating layer, a semiconductor layer, a source-drain metal layer, a first passivation layer, a color filter layer, a second passivation layer, and a pixel electrode layer on a second base substrate, where the gate layer includes a gate electrode and an electrode signal line for providing an electrical signal to the transparent electrode layer of the counter substrate, the pixel electrode layer includes a pixel electrode and a first electrode connecting the electrode signal line and the conductive substance through a second via hole.

Figure 8:
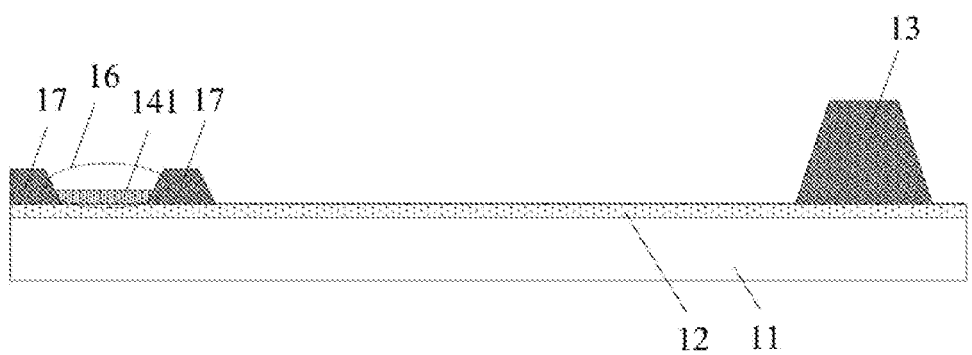
FIG. 8 is schematic diagram of the structure of the counter substrate with part of the light shielding layer removed in an embodiment of the present disclosure.

Referring to FIG. 8, an embodiment of the present disclosure further provides a counter substrate, including: a transparent electrode layer 12 arranged on a first base substrate 11; a spacer pattern 13 and a frame light shielding pattern 17 arranged on the transparent electrode layer 12, where the frame light shielding pattern 17 includes a first via hole 16 that exposes a portion of the transparent electrode layer 12; and a conductive light shielding layer pattern 141 arranged in the first via hole 16.

Optionally, the conductive light shielding layer pattern 141 is conductive metallic oxide layer after being treated with hydrogen plasma, and specifically the metallic oxide, for example, may be indium tin oxide.

Optionally, the light shielding layer pattern 141 is a metal light shielding layer pattern, and specifically the metal, for example, may be one of Mo, Al, and Nd, or a combination thereof.

Optionally, the transparent electrode layer 12 is a transparent common electrode layer; or the transparent electrode layer 12 is a transparent common electrode layer reused as a touch electrode layer.

Optionally, the transparent electrode layer 12 is an annealed conductive transparent metallic oxide layer and specifically the metallic oxide, for example, may be indium tin oxide.

Figure 9:
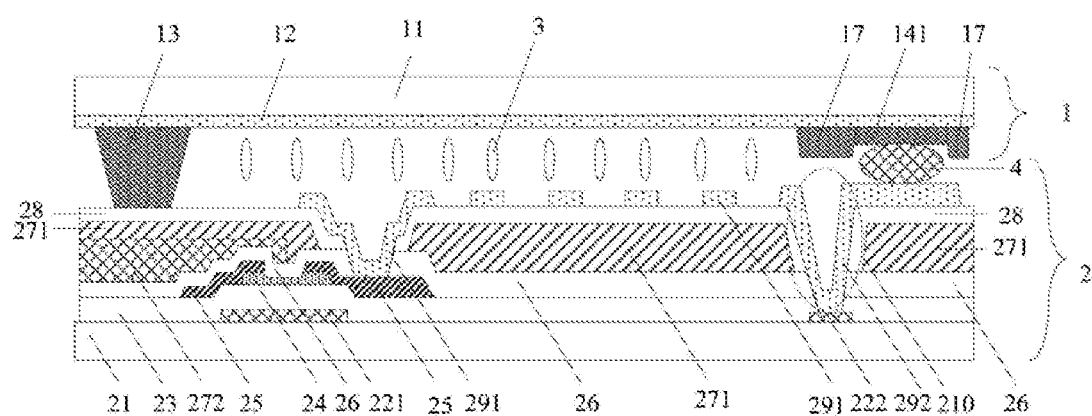
FIG. 9 is a schematic diagram of the structure of a display panel according to an embodiment of the present disclosure.

Referring to FIG. 9, an embodiment of the present disclosure further provides a display panel, including the counter substrate 1 according to the embodiment of the present disclosure and further including an array substrate 2.

Optionally, the array substrate 2 further includes a conductive substance 4 arranged in a sealant region, the conductive substance 4 comes into contact with the conductive light shielding layer pattern 141 in the first via hole of the counter substrate 1 so that the array substrate 2 provides an electrical signal for the transparent electrode layer 12 of the counter substrate 1 through the conductive substance 4.

In the specific implementation, the array substrate 2 further includes: a gate layer, a gate insulating layer 23, a semiconductor layer 24, a source-drain metal layer 25, a first passivation layer 26, a color filter layer, a second passivation layer 28, and a pixel electrode layer, which are arranged on the second substrate 21 sequentially, where the gate layer includes a gate electrode 221 and an electrode signal line 222 for providing an electrical signal to the transparent electrode layer 12 of the counter substrate 1, the color filter layer includes a first color resistor film layer 271 which for example is a red color resistor film layer, and a second color resistor film layer 272 which for example is a blue color resistor film layer (of course, in specific implementation, other color resistor film layers may be included and will not be limited herein), where the overlapping region of the first and second film layers may be substituted with a black matrix to shield gate lines and data lines. The pixel electrode layer includes a pixel electrode 291 and a first electrode 292 connecting the electrode signal line 222 and the conductive substance 4 at the second via hole 210. A liquid crystal layer 3 may also be arranged between the counter substrate 1 and the array substrate 2.

An embodiment of the present disclosure further provides a display device, including the display panel according to the embodiment of the present disclosure.

For a more detailed description of the fabricating method of the counter substrate according to the present disclosure, the following description is made in conjunction with FIGS. 3 to 8.

Figure 3:
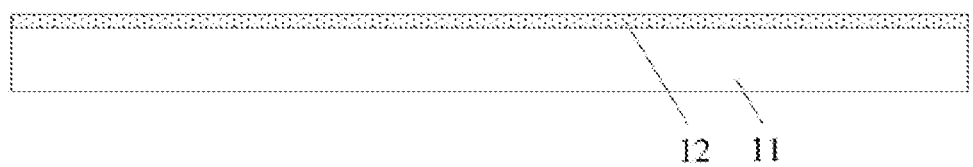
FIG. 3 is schematic diagram of the structure of the counter substrate with a transparent electrode layer prepared in an embodiment of the present disclosure.

First step is to deposit a layer of transparent metallic oxide which is indium tin oxide on the glass base substrate 11 to serve as a transparent electrode layer 12 which specifically may be a transparent common electrode layer, and anneal the layer of indium tin oxide. The schematic diagram where the transparent electrode layer 12 is formed on the substrate 11 is as shown in FIG. 3.

Figure 4:
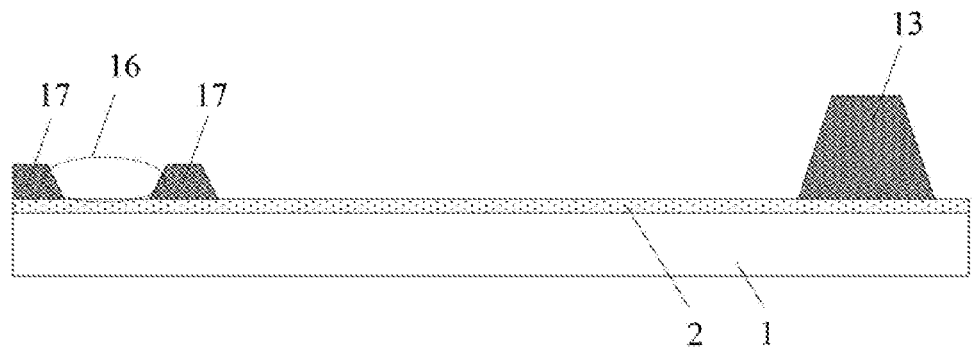
FIG. 4 is schematic diagram of the structure of the counter substrate with a spacer pattern and a frame light shielding pattern prepared in an embodiment of the present disclosure

Second step is to fabricate a black spacer layer on the annealed indium tin oxide layer, form a spacer pattern 13 in a region corresponding to the pixel region using the gray tone mask process, and form a frame light shielding layer pattern 17 in the peripheral region, where the frame light shielding pattern 17 includes a first via hole 16 exposing a portion of the transparent electrode layer 12, and the thickness of the spacer pattern 13 is larger than the thickness of the frame light shielding pattern 17. A schematic diagram where the spacer pattern 13 and the frame light shielding pattern 17 are formed on the transparent electrode layer 12 is as shown in FIG. 4.

Figure 5:
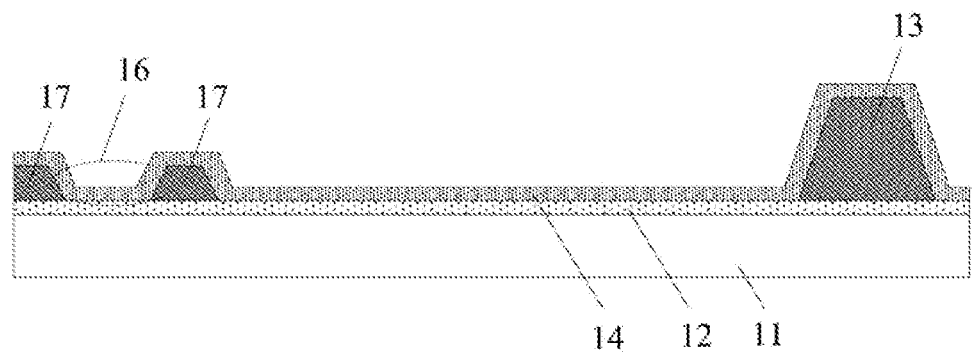
FIG. 5 is schematic diagram of the structure of the counter substrate with an light shielding layer prepared in an embodiment of the present disclosure.

Third step is to deposit an indium tin oxide layer and treat the indium tin oxide layer with hydrogen plasma to reduce the transmittance of the transparent indium tin oxide layer to form the light shielding layer 14. The schematic diagram where the light shielding layer 14 is formed is as shown in FIG. 5.

Figure 6:
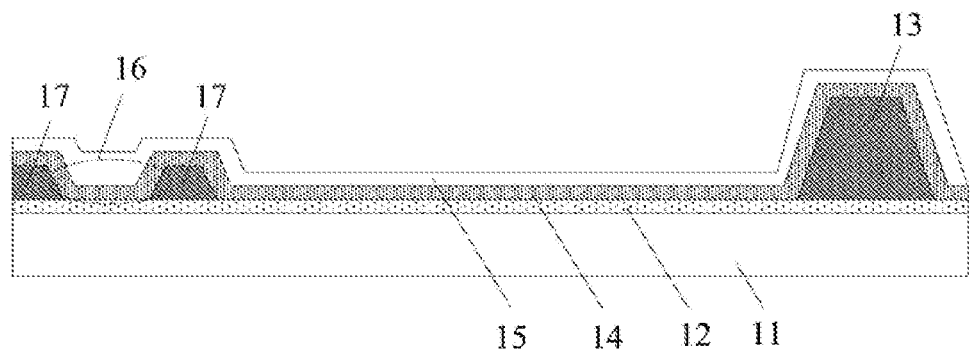
FIG. 6 is schematic diagram of the structure of the counter substrate with a photoresist layer prepared in an embodiment of the present disclosure.

Fourth step is to coat a photoresist layer 15 on the treated indium tin oxide layer, where since there is no pattern in a large area of the pixel region, the photoresist is relatively thin, and the photoresist in the first via hole 16 is relatively thick because the first via hole 16 is small. The schematic diagram where the photoresist layer 15 is coated is as shown in FIG. 6.

Figure 7:
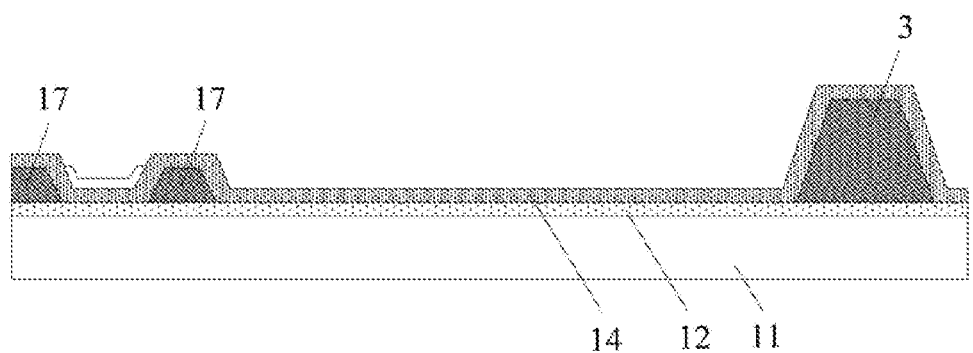
FIG. 7 is schematic diagram of the structure of the counter substrate with part of the photoresist layer removed in an embodiment of the present disclosure.

Fifth step is to dry etch the entire photoresist layer 15, where the photoresist in regions other than the first via hole 16 region is completely removed, and part of the photoresist in the first via hole 16 region is left. The schematic diagram where the photoresist layer 15 is removed is as shown in FIG. 7.

Sixth step is to etch the indium tin oxide layer treated with hydrogen plasma, under the shielding of the photoresist in the first via hole 16, where the indium tin oxide of the transparent electrode layer 12 is subjected to high temperature annealing to form polycrystalline indium tin oxide which cannot be etched by an amorphous indium tin oxide etchant. The schematic diagram where the light shielding layer 14 is etched is as shown in FIG. 8.

Seventh step is to align the counter substrate 1 and the prepared array substrate 2 and allow the conductive substance 4 of the array substrate 2 to come into contact with the conductive light shielding layer pattern 141 in the first via hole 16 of the counter substrate 1 so that the array substrate 2 provides an electrical signal for the transparent electrode layer 12 of the counter substrate through the conductive substance 4. The display panel of which the counter panel and the array substrate are aligned is as shown in FIG. 9.

The embodiments of the present disclosure have the advantages as follows: by firstly forming a transparent electrode layer on the first base substrate, and then forming a spacer pattern and a frame light shielding pattern on the transparent electrode layer at the same time, where the frame light shielding pattern includes a first via hole exposing a portion of the transparent electrode layer, the spacer pattern and the frame light shielding pattern can be formed at the same time on the counter substrate by using a mask process once while ensuring that the counter substrate can be in conductivity with the array substrate, and a conductive light shielding layer pattern is formed in the first via hole, to prevent the counter substrate from having a light leak problem at the first via hole.

It will be apparent to those skilled in the art that various changes and modifications can be made in the present disclosure without departing from the spirit and scope of the present disclosure. In this manner, the present disclosure is intended to incorporate such modifications and variations as the modifications and variations of the present disclosure are within the scope of the appended claims of the present disclosure and the equivalents thereof.

The invention claimed is:

1. A fabricating method of a counter substrate, comprising:
    forming a transparent electrode layer on a first base substrate;
    forming a spacer pattern and a frame light shielding pattern at a same time on the transparent electrode layer, wherein the frame light shielding pattern comprises a first via hole that exposes a portion of the transparent electrode layer, wherein a thickness of the spacer pattern is larger than a thickness of the frame light shielding pattern; and
    forming a conductive light shielding layer pattern in the first via hole;
    wherein the forming the conductive light shielding layer pattern in the first via hole comprises:
    forming an entire conductive light shielding layer;
    coating a photoresist layer on the conductive light shielding layer, wherein the thickness of the photoresist layer in the first via hole is larger than the thickness of the photoresist layer in regions other than the first via hole;
    thinning the photoresist layer to further remove all photoresist in regions other than the first via hole, and removing part of photoresist in the first via hole at the same time; and
    removing the conductive light shielding layer in regions other than the first via hole under the shielding of the photoresist in the first via hole;
    wherein the forming the entire conductive light shielding layer comprises:
    forming an entire conductive transparent metallic oxide layer, and treating the transparent metallic oxide layer with hydrogen plasma to reduce transmittance of the transparent metallic oxide layer to further form the conductive light shielding layer;
    wherein when the transparent electrode layer is a conductive transparent metallic oxide layer,
    the forming the transparent electrode layer on the first base substrate comprises: forming a conductive transparent metallic oxide layer on the first base substrate, and annealing the transparent metallic oxide layer; and
    the removing the conductive light shielding layer in regions other than the first via hole under the shielding of the photoresist in the first via hole comprises: removing the conductive light shielding layer in regions other than the first via hole using solution etching under the shielding of the photoresist in the first via hole.

2. The fabricating method according to claim 1, wherein the forming the entire conductive light shielding layer comprises:
    forming an entire conductive metal light shielding layer.

3. The fabricating method according to claim 1, wherein the forming the transparent electrode layer on the first base substrate comprises:
    forming a transparent common electrode layer on the first base substrate; or forming a transparent common electrode layer reused as a touch electrode on the first base substrate.

4. The fabricating method according to claim 1, wherein the forming the spacer pattern and the frame light shielding pattern at the same time on the transparent electrode layer comprises:
    forming the spacer pattern and the frame light shielding pattern at the same time on the transparent electrode layer using a gray tone mask process.

5. A fabricating method of a display panel, comprising:
    forming an array substrate;
    forming a counter substrate; and
    aligning the array substrate and the counter substrate;
    wherein the forming the counter substrate comprises:
    forming a transparent electrode layer on a first base substrate;
    forming a spacer pattern and a frame light shielding pattern at a same time on the transparent electrode layer, wherein the frame light shielding pattern comprises a first via hole that exposes a portion of the transparent electrode layer, wherein a thickness of the spacer pattern is larger than the thickness of the frame light shielding pattern; and
    forming a conductive light shielding layer pattern in the first via hole;
    wherein the forming the conductive light shielding layer pattern in the first via hole comprises:
    forming an entire conductive light shielding layer;
    coating a photoresist layer on the conductive light shielding layer, wherein the thickness of the photoresist layer in the first via hole is larger than the thickness of the photoresist layer in regions other than the first via hole;
    thinning the photoresist layer to further remove all photoresist in regions other than the first via hole, and removing part of photoresist in the first via hole at the same time; and
    removing the conductive light shielding layer in regions other than the first via hole under the shielding of the photoresist in the first via hole;
    wherein the forming the entire conductive light shielding layer comprises:
    forming an entire conductive transparent metallic oxide layer, and treating the transparent metallic oxide layer with hydrogen plasma to reduce transmittance of the transparent metallic oxide layer to further form the conductive light shielding layer;
wherein when the transparent electrode layer is a conductive transparent metallic oxide layer,
    the forming the transparent electrode layer on the first base substrate comprises: forming a conductive transparent metallic oxide layer on the first base substrate, and annealing the transparent metallic oxide layer; and
    the removing the conductive light shielding layer in regions other than the first via hole under the shielding of the photoresist in the first via hole comprises: removing the conductive light shielding layer in regions other than the first via hole using solution etching under the shielding of the photoresist in the first via hole.

6. The fabricating method according claim 5, wherein the forming the array substrate comprises: mixing a conductive substance and a sealant, and then coating a mixture of the conductive substance and the sealant on a sealant region of the array substrate;
    the aligning the array substrate and the counter substrate comprises: aligning the array substrate and the counter substrate, and allowing the conductive substance of the array substrate to come into contact with the conductive light shielding layer pattern in the first via hole of the counter substrate so that the array substrate provides an electrical signal for the transparent electrode layer of the counter substrate.

7. A counter substrate, comprising:
- a transparent electrode layer arranged on a first base substrate;
- a spacer pattern and a frame light shielding pattern arranged on the transparent electrode layer, wherein the frame light shielding pattern comprises a first via hole that exposes a portion of the transparent electrode layer, wherein a thickness of the spacer pattern is larger than a thickness of the frame light shielding pattern; and
- a conductive light shielding layer pattern arranged in the first via hole;
- wherein the transparent electrode layer is a polycrystalline indium tin oxide layer, and the conductive light shielding layer pattern is amorphous indium tin oxide layer.

8. The counter substrate according to claim 7, wherein the transparent electrode layer is a transparent common electrode layer; or the transparent electrode layer is a transparent common electrode layer reused as a touch electrode layer.

9. The counter substrate according to claim 7, wherein the conductive light shielding layer pattern is a conductive transparent metallic oxide layer treated with hydrogen plasma.

10. The counter substrate according to claim 9, wherein the conductive transparent electrode layer is an annealed conductive transparent metallic oxide layer.

11. The counter substrate according to claim 7, wherein the conductive light shielding layer pattern is a metal light shielding layer pattern.

12. A display panel, comprising the counter substrate according to claim 7 and further comprising an array substrate.

13. The display panel according to claim 12, wherein the array substrate further comprises a conductive substance arranged in a sealant region, the conductive substance comes into contact with the conductive light shielding layer pattern in the first via hole of the counter substrate so that the array substrate provides an electrical signal for the transparent electrode layer of the counter substrate through the conductive substance.

14. A display device, comprising the display panel according to claim 12.

15. The counter substrate according to claim 7, wherein the transparent electrode layer is polycrystalline, and the conductive light shielding layer pattern is amorphous and made of a same material as the transparent electrode layer.

* * * * *